UNITED STATES PATENT OFFICE.

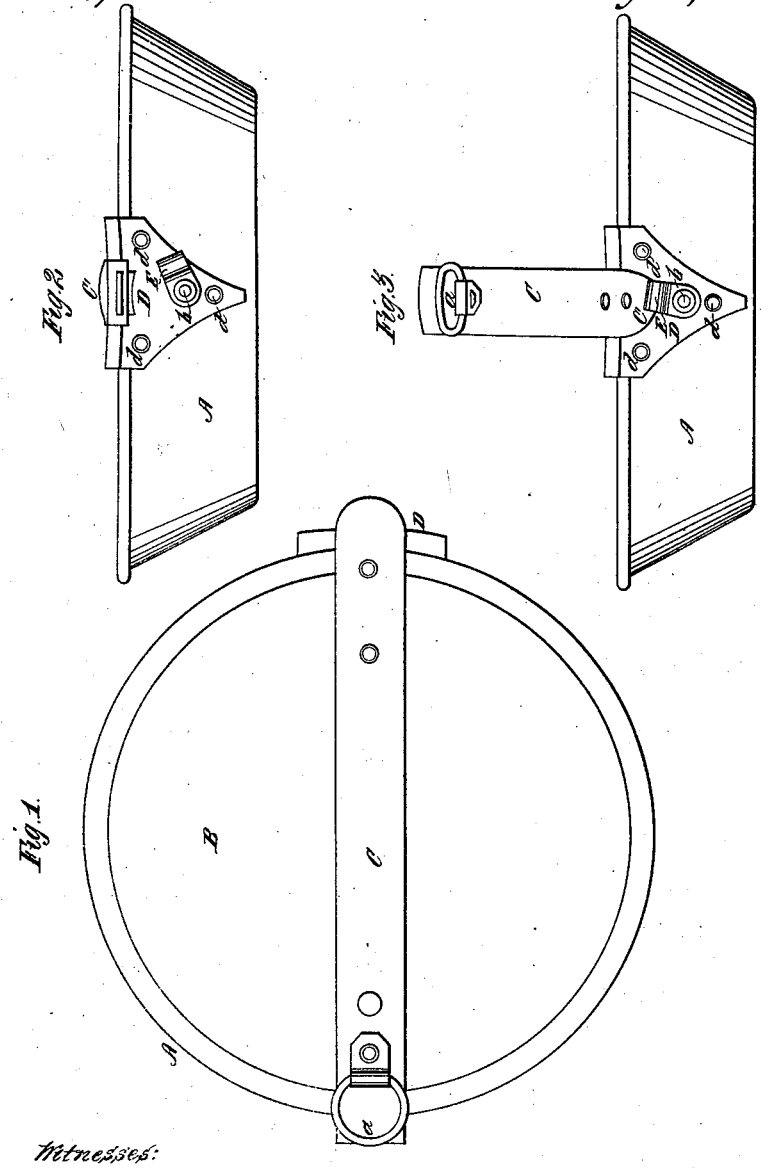

CYRUS AVERY, OF ASHTABULA, OHIO.

IMPROVEMENT IN FRYING-PAN AND KETTLE.

Specification forming part of Letters Patent No. 43,965, dated August 30, 1864.

*To all whom it may concern:*

Be it known that I, C. AVERY, of Ashtabula, in the county of Ashtabula and State of Ohio, have invented a new and Improved Frying-Pan and Kettle for Camp Service, being an improvement on an application filed March 10, 1864, for a similar invention; and I do hereby declare that the following is a full and complete description of the construction and operation of the same, reference being had to the accompanying drawings, making a part of this specification, in which—

Figure 1 is a top view. Figs. 2 and 3 are side views representing the manner in which the handle of the frying-pan is held in place.

Like letters of reference indicate like parts.

The nature of my improvement relates to the more effective mode of securing the handle of the pan in the desired position.

In the figures, A represents the frying-pan, B the pan inside, and C the bail or handle, all of which are constructed and arranged in the manner and for the purpose set forth in the former application, with the exception of the manner of securing the handle to the pan.

In Figs. 2 and 3, which represent the device for holding the handle in place, D is a clip, secured to the pan by rivets $d$, to the top of which is hinged the bail C, that can be adjusted into a handle for the pan by raising it from the position seen in Figs. 1 and 2, and turning it back as in Fig. 3. It can then be securely held in this position by turning round onto the end C' of the handle the button or catch E, as represented in Fig. 3. This catch is secured by a rivet, $b$, to the pan, or it can be fastened in place by the lower rivet, $d$, of the clip. Any device similar or equivalent to the catch E, answering the same purpose, can be substituted in its place. The end C', onto which the adjustable catch E passes, is shaped so that the lower edge fits close to the surface of the clip D, and curves out a little upward from the lower edge, thereby causing the catch to take a firmer hold the more it is turned round on to the handle, thus holding securely and permanently the handle of the pan as long as may be desired, and in any position in which the pan may be placed. As it was arranged before, the end of the handle as it was turned back simply rested on a projection, which was liable to become loose by constant use, and the handle would not be held firm when extended. The pan also had always to be held in a certain position to retain the handle in place, thereby unfitting it for many uses for which it is now adapted.

$a$, Figs. 2 and 3, represents a ring attached to the bail, for hanging up the pan.

What I claim as my improvement, and desire to secure by Letters Patent, is—

The adjustable catch E, or its equivalent, in combination with the handle and pan, for the purpose specified.

CYRUS AVERY.

Witnesses:
W. H. BURRIDGE,
S. C. TALCOTT.